US010547373B2

(12) United States Patent
Axmon et al.

(10) Patent No.: US 10,547,373 B2
(45) Date of Patent: Jan. 28, 2020

(54) WIRELESS COMMUNICATION LINKS BETWEEN AIRBORNE AND GROUND-BASED COMMUNICATIONS EQUIPMENT

(71) Applicant: Telefonaktiebolaget LM Ericsson (publ), Stockholm (SE)

(72) Inventors: Joakim Axmon, Limhamn (SE); Christopher Callender, Kinross (GB); Mikael Prytz, Ronninge (SE); Imadur Rahman, Sollentuna (SE); Esther Sienkiewicz, Ottawa (CA)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 16/345,692

(22) PCT Filed: Oct. 26, 2017

(86) PCT No.: PCT/EP2017/077419
§ 371 (c)(1),
(2) Date: Apr. 26, 2019

(87) PCT Pub. No.: WO2018/078004
PCT Pub. Date: May 3, 2018

(65) Prior Publication Data
US 2019/0260462 A1 Aug. 22, 2019

Related U.S. Application Data

(60) Provisional application No. 62/414,107, filed on Oct. 28, 2016.

(51) Int. Cl.
*H04B 7/185* (2006.01)
*H04B 7/204* (2006.01)

(52) U.S. Cl.
CPC ..... *H04B 7/18506* (2013.01); *H04B 7/18519* (2013.01); *H04B 7/18523* (2013.01); *H04B 7/2041* (2013.01)

(58) Field of Classification Search
CPC .............. H04B 7/18506; H04B 7/2041; H04B 7/18519; H04B 7/18523
See application file for complete search history.

(56) References Cited

U.S. PATENT DOCUMENTS

| 5,790,071 A | 8/1998 | Silverstein et al. |
| 8,688,101 B1 | 4/2014 | Hayes et al. |

(Continued)

FOREIGN PATENT DOCUMENTS

| CN | 103873133 A | 6/2014 |
| CN | 204103537 U | 1/2015 |

(Continued)

OTHER PUBLICATIONS

PCT International Search Report, dated Jan. 11, 2018, in connection with International Application No. PCT/EP2017/077419, all pages.

(Continued)

*Primary Examiner* — Chuong A Ngo
(74) *Attorney, Agent, or Firm* — Leffler Intellectual Property Law, PLLC; Kenneth B. Leffler

(57) ABSTRACT

A flight transceiver station (FTS) mounted onboard an aircraft communicates with one or more terrestrial transceiver points by determining, for a future moment in time, a position of the flight transceiver station in 3-dimensional space; an attitude of the flight transceiver station; one or more respective directions from the position of the flight transceiver station to the one or more terrestrial transceiver points; respective radial velocities between the flight transceiver station and the one or more terrestrial transceiver points. The FTS also determines, based on the respective (Continued)

directions and attitudes, beamforming weights for one or more transmit beams towards each of the one or more terrestrial transceiver points; and predicts, based on the respective radial velocities, respective Doppler shifts of a carrier frequency used between the flight transceiver station and the one or more terrestrial transceiver points. The beamforming weights for the one or more transmit beams, and a Doppler pre-compensation based on the predicted Doppler shifts are applied to transmitter equipment of the flight transceiver station, at the future moment in time.

24 Claims, 11 Drawing Sheets

(56) References Cited

U.S. PATENT DOCUMENTS

| | | | |
|---|---|---|---|
| 8,914,022 B2 | 12/2014 | Kostanic et al. | |
| 9,008,669 B2 | 4/2015 | Hyslop et al. | |
| 2006/0229076 A1* | 10/2006 | Monk | H04W 16/28 455/442 |
| 2006/0229077 A1 | 10/2006 | Monk | |
| 2006/0239238 A1 | 10/2006 | Fernandez-Corbaton et al. | |
| 2007/0161347 A1 | 7/2007 | Ma et al. | |
| 2009/0186611 A1 | 7/2009 | Stiles et al. | |
| 2011/0182230 A1 | 7/2011 | Ohm et al. | |
| 2011/0189943 A1 | 8/2011 | Ilarregui et al. | |
| 2013/0147652 A1* | 6/2013 | Haque | G08G 5/0008 342/21 |
| 2013/0324070 A1* | 12/2013 | Bennett | H04W 84/005 455/404.1 |
| 2014/0177461 A1 | 6/2014 | Seyedmehdi et al. | |
| 2014/0266896 A1 | 9/2014 | Hyslop | |
| 2015/0098415 A1 | 4/2015 | Chen | |
| 2015/0146692 A1 | 5/2015 | Yi et al. | |
| 2016/0212669 A1 | 7/2016 | Davis | |
| 2017/0127332 A1 | 5/2017 | Axmon et al. | |
| 2017/0155442 A1 | 6/2017 | Hommel et al. | |

FOREIGN PATENT DOCUMENTS

| | | |
|---|---|---|
| EP | 1976152 A1 | 10/2008 |
| EP | 2161855 A1 | 3/2010 |
| EP | 2214328 A2 | 8/2010 |
| EP | 2278732 A2 | 1/2011 |
| WO | 9945609 A1 | 9/1999 |
| WO | 2006105316 A2 | 10/2006 |
| WO | 2013010370 A1 | 1/2013 |

OTHER PUBLICATIONS

PCT Written Opinion, dated Jan. 11, 2018, in connection with International Application No. PCT/EP2017/077419, all pages.
ETSI TR 103 054 V1.1.1 (Jul. 2010), Electromagnetic compatibility and Radio spectrum Matters (ERM); System Reference Document; Broadband Direct-Air-to-Ground Communications operating in part of the frequency range from 790 MHz to 5 150 MHz, 23 pages.
ETSI TR 103 108 V1.1.1 (Jul. 2013), Electromagnetic compatibility and Radio spectrum Matters (ERM); System Reference document (SRdoc); Broadband Direct-Air-to-Ground Communications System operating in the 5,855 GHz to 5,875 GHz band using 3G technology, 25 pages.
ETSI TR 101 599 V1.1.3 (Sep. 2012), Electromagnetic compatibility and Radio spectrum matters (ERM) System Reference Document (SRDoc); Broadband Direct-Air-to-Ground Communications System employing beamforming antennas, operating in the 2,4 GHz and 5,8 GHz bands, 31 pages.
PCT International Search Report, dated Dec. 19, 2016, in connection with International Application No. PCT/EP2016/072624, all pages.
PCT Written Opinion, dated Dec. 19, 2016, in connection with International Application No. PCT/EP2016/072624, all pages.
PCT International Search Report, dated Jan. 23, 2017, in connection with International Application No. PCT/EP2016/075683, all pages.
Non-Final Office Action dated Apr. 28, 2017 in connection with U.S. Appl. No. 14/931,063, 33 pages.

* cited by examiner

WIRELESS COMMUNICATION LINKS BETWEEN AIRBORNE AND GROUND-BASED COMMUNICATIONS EQUIPMENT

CROSS REFERENCE TO RELATED APPLICATIONS

This application claims the benefit of U.S. Provisional Application No. 62/414,107, filed Oct. 28, 2016, which is hereby incorporated herein by reference in its entirety.

BACKGROUND

The present invention relates to connectivity between land-based cellular communications systems and user equipment located in airborne craft, and more particularly to technology that maintains wireless links between airborne equipment and ground-based equipment.

The world is becoming more and more connected, and this has led consumers to have increasing expectations of being able to be online and experience at least moderate data rates regardless of time and location. As one response to these expectations, the next generation of mobile technology, the so-called IMT-2020 (5G), targets high-speed mobility as one objective. The exemplary scenarios studied are high-speed trains and vehicles on freeways, but following the recent trend, it is expected that terrestrial in-flight broadband service for airplanes will be in the scope—either as direct communication between the User Equipment (UE) and base station, or via an access point (AP) onboard the aircraft which aggregates the traffic of some number of UEs and maintains a link to the base station.

In 2013 the Federal Communications Commission (FCC) took steps towards enabling better connectivity by assigning a 500 MHz wide subband in the 14 GHz radiofrequency (RF) band for in-flight air-to-ground broadband connection. The FCC's expectation is that by year 2021 there will be a demand for 15000 flights offering high-speed broadband connectivity to its passengers. By comparison, the availability in year 2013 was 3000 airplanes world-wide, and this was with connections that were deemed too slow and by far too expensive by consumers. The industry has noted that today's airline passengers expect the same level of broadband service that is available on the ground.

Several trials have been carried out offering terrestrial network coverage in lower frequency bands typically used for regular cellular networks. Recent advances on the regulatory side of aviation will, if properly exploited, greatly enhance and simplify in-flight broadband services that are based on terrestrial networks.

The high-level principles for maintaining coverage for mobile communication equipment on the ground are well known. So-called radio base stations are deployed at various geographical positions, and for a given mobile communication equipment, a "best-suited" base station is selected as the point of connection into the communications system. As the mobile communication equipment changes its position, the quality of its radio connection with the serving base station may deteriorate to the extent that a reselection is made, whereby a better-suited base station takes over as the serving base station.

Beam-forming technology can be used to facilitate radio communications between the airborne and ground-based equipment. But in conventional technology, the beam-forming equipment onboard the aircraft does not know the precise location of the terrestrial node it is transmitting to, nor does it rely on the aircraft's navigational information (e.g., orientation, position, velocity). As a result, the beams intended to reach the ground equipment need to be wide enough to ensure that at least some of the energy from the transmission actually reaches the terrestrial node.

But the use of wide beams for uplink transmissions (the direction from air to ground, in some earlier documents also known as the reverse link) may cause interference for terrestrial UEs in a wide area when terrestrial operator frequencies are reused for the air-to-ground (A2G) backhaul link. The interference reduces the uplink performance for terrestrial UEs in the area that is covered by the beam(s) because the signals scatter and therefore cannot be blocked by spatial filtering.

Moreover, when wide beams are used for uplink transmission, each backhaul link potentially gets degraded by time dispersion, and also in some cases frequency dispersion (depending on solution/technology being applied), due to scattering of the signal to be received.

Additionally, the scattering reduces the possibility of reusing physical resources in the uplink in different beams since signals from both beams will impinge from various directions, rendering it challenging in many situations to block the interference by spatial filtering.

In situations in which the same set of beams serves two or more aircraft, or when certain physical resources (PRBs) are reserved for terrestrial UEs, it is imperative that orthogonality be maintained between the signals transmitted for or by different backhaul users (aircraft). Otherwise, inter-carrier interference will cause a degradation in performance of the respective links.

Hence there is a continued need for a method by which interference due to scattering and inter-carrier interference can be minimized and capacity can be maximized when wireless links between airborne and ground-based equipment are being used.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters are provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in flight transceiver station technology that communicates with one or more terrestrial transceiver points by a flight transceiver station while mounted onboard an aircraft. Communicating comprises the flight transceiver station determining the following, for a future moment in time t, a position of the flight transceiver station in 3-dimensional space;

an attitude of the flight transceiver station;

one or more respective directions from the position of the flight transceiver station to the one or more terrestrial transceiver points;

respective radial velocities between the flight transceiver station and the one or more terrestrial transceiver points; and based on the respective directions and attitudes, beamforming weights for one or more transmit beams towards each of the one or more terrestrial transceiver points.

The flight transceiver station also predicts, based on the respective radial velocities, respective Doppler shifts of a carrier frequency used between the flight transceiver station and the one or more terrestrial transceiver points. Then, at the future moment in time t, the flight transceiver station applies to flight transceiver station transmitter equipment the beamforming weights for the one or more transmit beams; and a Doppler pre-compensation based on the predicted Doppler shifts.

In some embodiments, the flight transceiver station also determines, based on the respective directions and attitudes, beamforming weights for one or more reception beams towards each of the one or more terrestrial transceiver points; and then applies to receiver equipment of the flight transceiver station, at or following the future moment in time t:
the beamforming weights for the one or more reception beams; and
a Doppler post-compensation based on the predicted Doppler shifts.

In some embodiments, the flight transceiver station determines, for the future moment in time t, respective distances between the flight transceiver station and each of the one or more terrestrial transceiver points; and determines a transmit timing adjustment and/or a transmit power level adjustment for the one or more transmit beams based on a difference between the distance determined for the future moment in time t, and a corresponding distance determined at a time of a respective previous transmit timing adjustment and/or a previous transmit power level adjustment The flight transceiver station then applies to transmitter equipment of the flight transceiver station, at the future moment in time t, the determined transmit timing adjustment and/or the transmit power level adjustment.

In some embodiments, the position of the flight transceiver station in 3-dimensional space is determined directly or indirectly by means of information obtained from a global navigation satellite system and a prediction of a flight path of the aircraft.

In some embodiments, the flight transceiver station obtains positions of the one or more terrestrial transceiver points via any one of:
a control plane communication;
a user plane communication; and
a pre-loaded data storage component in the flight transceiver station.

In some embodiments, the operation of the flight transceiver station includes computing the radial velocities between the flight transceiver station and the one or more terrestrial transmission points as a change in respective Euclidean distances between the flight transceiver station and the one or more terrestrial transceiver points during an interval of time.

In some embodiments, the operation of the flight transceiver station includes computing the radial velocities between the flight transceiver station and the one or more terrestrial transmission points as scalar products between the velocity of the flight transceiver station and the respective directions to the one or more terrestrial transceiver points.

In some embodiments, the attitude of the flight transceiver station is provided by a flight manager system.

In some embodiments, the attitude of the flight transceiver station is determined using gyroscopes.

In some embodiments, determining the transmit timing adjustment comprises determining differences in respective distances between the flight transceiver station and the one or more terrestrial transmission points between the previous transmit timing adjustment and the future moment in time t; and further includes calculating, based on line-of-sight propagation conditions, a propagation time difference resulting from the determined differences in respective distances.

In some embodiments, determining the transmit power level adjustment comprises determining differences in respective distances between the flight transceiver station and the one or more terrestrial transmission points between the previous transmit timing adjustment and the future moment in time t; and calculating, based on a propagation loss model for electromagnetic waves, a change in propagation loss resulting from the determined differences in respective distances.

In some embodiments, operation of the flight transceiver station includes predicting the flight path of the aircraft using a regression model that is based on past 3-dimensional positions of the flight transceiver station at a plurality, N, of past times and that extrapolates the velocity and 3-dimensional positions of the flight transceiver station to obtain the position of the flight transceiver station in 3-dimensional space at the future moment in time t.

In another aspect of some embodiments, operation of the flight transceiver station includes receiving configuration information about one or more handover target terrestrial transceiver points; and determining for application at a second future moment in time, t2:
transmission beam steering weights for one or more transmit beams towards each of the one or more handover target terrestrial transceiver points;
reception beam steering weights for one or more reception beams towards each of the one or more handover target terrestrial transceiver points;
a Doppler pre-compensation to be applied to received signals from the one or more handover target terrestrial transceiver points; and
a transmission power level to be applied to transmitted signals directed towards the one or more handover target terrestrial transceiver points.

Then, at or following the second future moment in time, the flight transceiver station applies:
the transmission beam steering weights for the one or more transmit beams towards each of the one or more handover target terrestrial transceiver points;
the reception beam steering weights for the one or more reception beams towards each of the one or more handover target terrestrial transceiver points;
the Doppler pre-compensation to be applied to the received signals from the one or more handover target terrestrial transceiver points; and
the transmission power level to be applied to the transmitted signals directed towards the one or more handover target terrestrial transceiver points.

Then the flight transceiver station commences communications with the handover target terrestrial transceiver points.

BRIEF DESCRIPTION OF THE DRAWINGS

The objects and advantages of the invention will be understood by reading the following detailed description in conjunction with the drawings in which.

DETAILED DESCRIPTION

Figure 1:
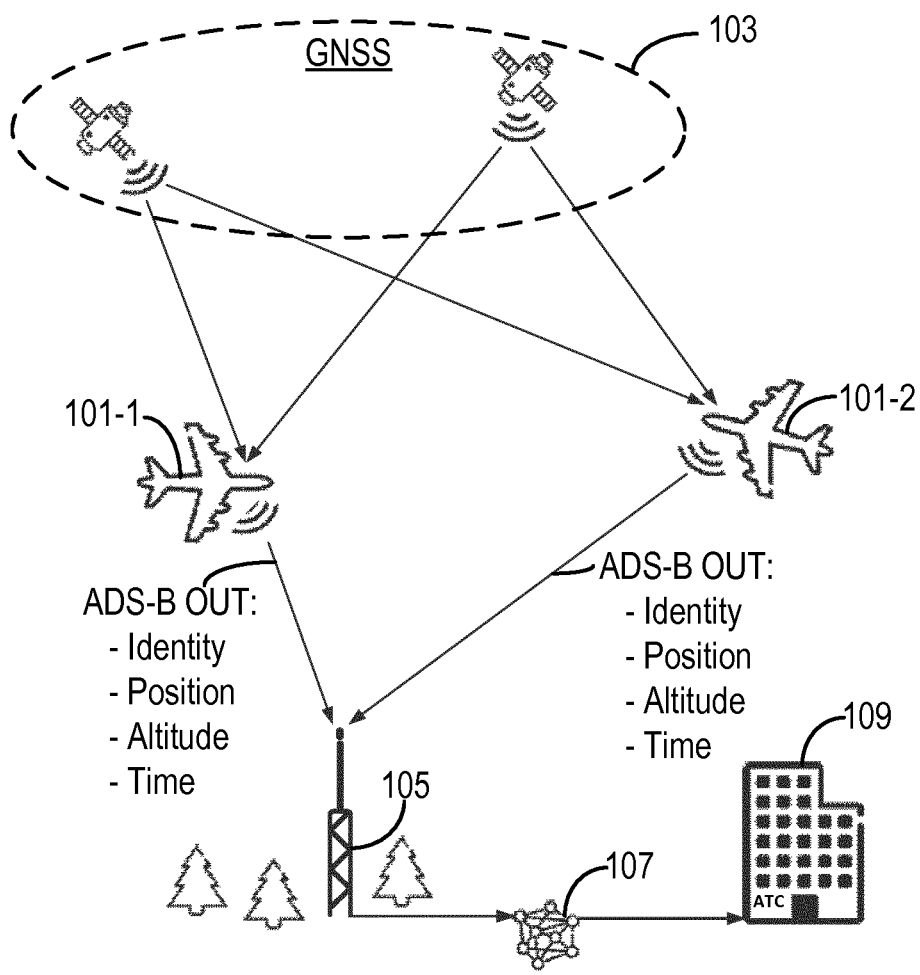
FIG. 1 illustrates an ADS-B deployment.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone or in combination with one or more programmed processors). Moreover, the invention can additionally be considered to be embodied entirely within any form of nontransitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

It will be further recognized that in each of the embodiments, the various actions can be performed by server circuitry that makes its functionality available to nodes as a service that is accessible by means of the Internet or similar data network (i.e., available via "the cloud").

With respect to terminology used herein, in some embodiments the non-limiting term UE is used. The UE herein can be any type of wireless device capable of communicating with a network node or another UE over radio signals. The UE may also be a radio communication device, target device, device to device UE, machine type UE or UE capable of machine to machine communication, a sensor equipped with UE, Tablet, mobile terminal, smart phone, laptop embedded equipment (LEE), laptop mounted equipment (LME), USB dongle, Customer Premises Equipment (CPE), and the like.

Also in some embodiments generic terminology, "radio network node" or simply "network node (NW node)", is used. This can be any kind of network node which may comprise any one or more of: a base station, a radio base station, a base transceiver station, a base station controller, a network controller, an evolved Node B (eNB), a Node B, a radio network controller (RNC), a relay node, a positioning node, an Evolved Serving Mobile Location Centre (E-SMLC), a location server, a repeater, an access point (AP), a radio access point, a Remote Radio Unit (RRU), a Remote Radio Head (RRH), a Remote Antenna Unit (RAU), a multi-standard radio (MSR) radio node such as MSR BS nodes in a distributed antenna system (DAS), a SON node, an Operations and Maintenance (O&M) node, an OSS, an MDT node, a Core network node, a Mobility Management Entity (MME), and the like.

Further, in some instances the description of embodiments may use the term "airplane". However, this is not intended to limit the invention in any way, and any such usage should be construed more broadly, for example as if the term "aircraft" (which encompasses not only airplanes, but other flying craft) had been used.

In some embodiments, aspects utilized in Single Frequency Networks (SFNs) are employed. In an SFN, multiple network nodes transmit the same information on the same carrier frequency and use the same cell identity in an area that may be wider than a single node can cover. Although traditionally used in Long Term Evolution (LTE) deployments for multicast broadcast, the term has been extended in recent 5G studies conducted by the Third Generation Partnership Project (3GPP) to also include dedicated communication in a cell that may be managed by several network nodes in a cooperative manner, where the wireless communication device is aware only of being in a particular cell and not aware of which network node it is communicating with. An SFN may involve several eNodeBs.

In some embodiments, aspects involve the use of a combined cell, which is a cell comprising a network node with multiple antenna nodes, with fully or partially overlapping coverage. In its simplest form a combined cell corresponds to an SFN with the same information transmitted from all antenna nodes, and in more elaborate forms time and frequency resources may be reused for example, in spatial diversity multiplexing schemes. A combined cell may be a special case of an SFN with only one eNodeB managing the SFN cell.

In an aspect of the technology described herein, it is observed that a new standard, called "Automatic Dependent Surveillance—Broadcast Out" (ADS-B OUT) has been or is on the way to being adopted in several parts of the world for the purpose of replacing Secondary Surveillance Radar (SSR) used by air traffic control (ATC). The existing system, SSR, is based on having a radar station ping an aircraft transponder (transmitter-responder) by which the transponder responds by sending information about the aircraft's identity, altitude, and the like. This allows ATC to track the aircraft and guide them to avoid collisions.

The newer system, ADS-B OUT, differs from SSR in that information is broadcast from the aircraft periodically, without first being triggered by a radar pulse. Information contained in the broadcast comprises (but is not limited to):
   Aircraft identity and call sign
   GPS-based position (latitude, longitude)
   Altitude
   GPS-based time at which position and altitude were determined Ground stations and proximal aircraft receive the broadcasts and relay them to the ATC facility that is responsible for that airspace. The system is less expensive than SSR since no radar stations are needed, and is up to 200 times more accurate, yielding a tolerance of 5.1 m with respect to position. The broadcast signals reach up to 280 km. The system can also be used when aircraft are taxiing on the ground.

The use of ADS-B OUT has already been mandated in Canadian and Australian airspaces, is mandated for use in European airspace for large aircraft starting in 2015 and for all aircraft starting in 2017, and is mandated for use in U.S. airspace starting in 2020. It is already mandated for some or all of the airways in Hong-Kong, Singapore, Vietnam, Taiwan, and Indonesia, and trials have been carried out in some countries such as South Korea and China. It is currently unclear when it will be mandated in the entire Asia-Pacific region, but although not mandatory the use of ADS-B is generally allowed. All major aircraft vendors now ship aircraft prepared with wiring for installment of ADS-B equipment and connection to the onboard flight navigation system and a certified Global Positioning System (GPS) receiver.

FIG. 1 illustrates an exemplary ADS-B deployment. Each airplane 101-1, 101-2 determines its position based on signals received from satellites that are part of a global navigation satellite system (GNSS), such as the United States' NAVSTAR GPS and the Russian GLONASS. Information indicating the airplane's identity, position, altitude and the time at which the coordinates were determined, is broadcast periodically and is received by a ground station 105 (and also by nearby airplanes). Once received by the ground station 105 the information is routed (e.g., through a communications network 107) to the ATC facility 109 responsible for that part of the airspace.

ADS-B OUT broadcasts can be received by aviation enthusiasts by using inexpensive equipment; a DVB-T USB dongle and open source software is all that is needed, at a cost of less than 20€. Professional grade ADS-B OUT receivers can be acquired for around 800€ including taxes. The rather inexpensive equipment has led to there being many ADS-B OUT receivers spread over the globe, and by sharing data with a server world-wide real-time tracking is possible. The most renowned service is Flightradar24, founded in Sweden and relying on 7000 volunteers internationally feeding received ADS-B OUT information to a centralized server. In short, receiving and decoding flight information is easily done and only requires inexpensive equipment. Identity, position and altitude can be determined for any airplane equipped with ADS-B OUT, which soon is to be a requirement in a large part of the global airspace.

To facilitate a better understanding of aspects of the invention, this description will first focus on definitions and terminology used herein and/or related to aspects of the technology.

Figure 2:
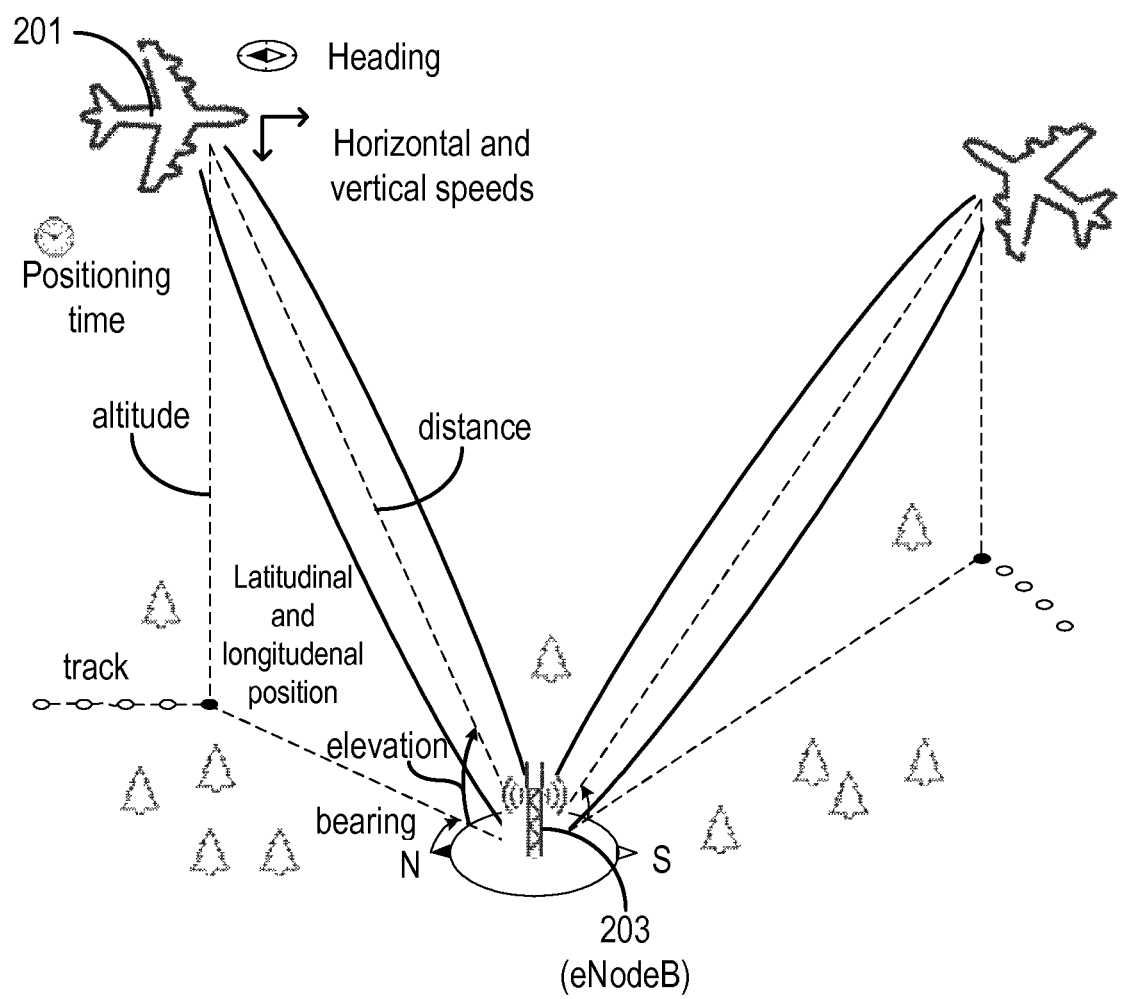
FIG. 2 illustrates navigational terminology used in connection with embodiments of the invention.

First with reference to movement and position, FIG. 2 illustrates several aircraft, in including the aircraft 201, flying within range of an eNodeB 203. The respective movements and positions of each aircraft relative to that of the eNodeB 203 can be expressed by a number of different measures, such as horizontal velocity, vertical velocity, heading, and track (also called "flight path"). The term heading refers to the direction in which the fuselage of an aircraft is pointing. The term track refers to the trajectory along which the fuselage of the aircraft is moving. The heading and track of the aircraft may or may not be in the same direction due to, for example, yaw.

The term "network node" (e.g., base station, Base Transceiver Station—BTS—(2G), NodeB (3G), eNodeB (4G) or gNodeB (5G)), refers to equipment (either standalone or distributed) that manages one or more terrestrial transmission points (TTPs), that together form one or more cells.

The terms ADS-B and ADS-B OUT are used interchangeably. ADS-B OUT is a subset of the functionality in ADS-B, and the technology described herein relies on that subset only.

The description presented herein illustrates various aspects of the technology with reference to aircraft in the form of airplanes and the like. However, the various aspects are not limited to those exemplary embodiments and may equally be applicable to rotorcrafts (e.g. helicopters), drones, etc., as long as those are broadcasting location information regularly.

The flight transceiver station (FTS) may interchangeably be called a relay node, network node, a UE, a base station, an access point (AP), etc., depending on whether viewing it from inside the cabin (by which it is a base station or AP) or from the ground (by which it e.g. may be viewed as a UE or a relay).

References made herein to active antenna systems refer to systems such as an antenna array that allows electronic steering of multiple beams by means of beamforming. In some but not necessarily all embodiments, there may also be mechanical steering of the antenna array.

The following is a list of some abbreviations used in this description, and/or related to the technology described herein:
Abbreviation Explanation
3D Three dimensional
A2G Air-to-ground communication
AAS Active antenna array
ACARS Aircraft Communications Addressing and Reporting System
ADS-B Automatic dependent surveillance broadcast
AES Aircraft Earth stations
ATC Air traffic control
ATN Aeronautical Telecommunications Network
CPDLC Traffic controller-pilot data link communication
DVB-T Digital video broadcasting—terrestrial
ESOMPS Earth stations on mobile platforms
FANS Future Air Navigation System
FCC Federal Communications Commission
FTS Flight transceiver station
GNSS Global navigation satellite system
GPS Global positioning system
ICAO International civil aviation organization
MIMO Multiple inputs multiple outputs
MME Mobility management entity
MU-MIMO Multi-user MIMO
PRB Physical resource block
RA Random access
RAN Radio access network RRC Radio Resource Control
SIB System information block
SSR Secondary surveillance radar
SV Space vehicle
TTP Terrestrial transceiver point
USB Universal serial bus Aspects of exemplary embodiments are described below for the FTS and the TTP separately. For convenience of illustration, in some instances a number of aspects are described together in combination in an embodiment. However, this is not intended to limit the scope of the invention. To the contrary, the inventors have recognized that different aspects of the technology described herein need not be combined to be useful, but instead constitute embodiments when practiced alone. Further, some aspects are described in terms of method steps. However, the invention may be embodied in other forms such as, but not limited to, apparatuses; systems; computer program products; and computer readable storage mediums comprising software whose instructions, when executed by one or more processors, causes equipment to perform the described methods.

A backhaul link for A2G communications is created by equipping aircraft with one or more base stations with large antenna arrays (e.g., a matrix of 256 antenna elements) that, when suitably controlled, are capable of beam steering towards the ground. Such base stations are henceforth referred to as a Flight Transceiver Station (FTS) which, in a broader sense, may be referred to as an Aircraft Earth Station (AES) or an Earth Station On Mobile Platform System (ESOMPS).

The FTS directs narrow beams towards one or more terrestrial transceiver points (TTP), which are base stations on Earth that are capable of beam steering towards the sky. One or more TTPs constitute a cell. As used herein, the term "narrow beam" refers to a beam that is formed taking into account knowledge of the TTP's location and the navigational information (e.g., orientation, position, velocity) of the aircraft (and hence also of the FTS), so that, because it is more precisely directed in the desired direction, is narrower than a "wide" beam that would otherwise be required to ensure that some of its energy reaches the TTP. In contrast to narrow beams, a wide beam will typically be transmitted from the bottom of an aircraft, pointing somewhat downwards. Since wide beams are formed without the information needed to actively target one TTP, the beamforming needs to take into account the range of heights through which the system needs to operate, and the inter-site distance in the terrestrial network. The transmitted energy from a wide beam covers quite a significant area underneath, in front of, behind, and to the sides of the aircraft. Narrow beams are substantially more focused than this because they are more precisely directed to the desired TTP.

The FTSs and TTPs, respectively, track each other's relative position in order to adapt the steering of the beam and adjust the transmit power.

Due to line of sight conditions (i.e., unlike in terrestrial communications, there is essentially nothing to scatter a signal directed towards a flying aircraft) the TTP or some other network node can predict when a handover to another TTP will become suitable. The handover decision therefore can be blind, i.e., it does not have to be based on the reporting of mobility measurements. The selection of which TTP to hand over to (i.e., selecting a "target" TTP) may depend on load conditions and relative positions of other aircraft because sharing a beam between two or more aircraft reduces the available capacity for each aircraft.

In one embodiment, at handover, the RRC connection reconfiguration message carries information on the geographical position(s) of the target TTP(s). The source TTP sends information to the target TTP on the identity of the aircraft to be handed over, by which the target directs a beam towards the FTS. The FTS uses the target TTP location provided in the RRC connection reconfiguration message, along with information about the FTS antenna orientation to direct one or more beams towards the target TTP.

In some embodiments, the locations of the TTPs are provided via system information, either in a newly defined SIB or as an extension to an existing one. When the FTS is handed over to another set of one or more TTPs, the FTS cross-checks the cell identity with the received system information to determine the locations of the target TTP(s).

In some alternative embodiments, the FTS has a database of geographical positions of TTP(s) and corresponding identities. When a handover is commanded, the source TTP sends the target TTP information about the identity of the aircraft to be handed over, by which the target directs a beam towards the FTS. The FTS looks up the location of the target TTP in its database and uses this information, along with information about the FTS's own location and antenna orientations to direct one or more beams towards the target TTP. The database can come preloaded in the FTS or may be acquired from a server (e.g., when preparing for takeoff).

Embodiments consistent with the invention are not limited to the above mentioned embodiments; rather, embodiments consistent with the invention can employ any means by which the FTS is made aware of the geographical location of the target TTP, which information may be used along with information about the FTS antenna orientation to direct one or more beams towards the target TTP.

In any of the embodiments described herein, the information about the FTS location and antenna orientation may be derived either from aircraft navigation systems (for example GPS, heading information, artificial horizon information) or from sensors which may be located within the FTS or the antenna subsystem (for example a GPS receiver, flux gate compass, gyroscope, etc.). Since the antenna array and the FTS are mounted in a fixed way in the aircraft, the relative orientations of each of these parts to the others is fixed, and the antenna array orientation relative to the aircraft, or relative to the FTS can be found, for example, by a calibration procedure which is performed when the components are installed in the aircraft, or it can be known to a certain degree of accuracy by the design of the components.

As mentioned above, some communications between airborne and ground-based equipment occur in the downlink direction, and others in the uplink direction. Aspects of the technology provide improvements in both of these, with some functionality being associated with the aircraft, and other technology being associated with a ground station. In overview, the technology comprises:

Functionality Performed by Aircraft-mounted Equipment

These aspects are embodied in the form of technology (e.g., methods and/or corresponding equipment) for interference reduction in a system onboard an aircraft for providing a wireless backhaul to ground stations, the system comprising an AAS base station capable of beam steering towards one or more ground stations. Other aspects provide improvements in the handling of handover of ongoing communications. In overview, the methodology comprises:

For reception of signals in the downlink direction (i.e., direction from ground to air, also known as forward link):

Calculating position, velocity, and radial velocity of the aircraft relative to the one or more ground stations transmitting on the downlink, based on one or more of the following:
    Information received from the ground station regarding the availability of one or more neighboring network nodes and associated location coordinates
    Predefined network map available at the node in the air
Using the relative position of the aircraft as a basis for steering a set of reception beams towards the one or more ground stations transmitting on the downlink
Using the radial velocity as a basis for computing Doppler shift, and then compensating for Doppler shift before processing the received downlink signals (e.g., by FFT). This is herein referred to as post-compensation (i.e., because the compensation occurs after receiving the Doppler-shift-affected signal.
For transmission of signals in the uplink direction (i.e., direction from air to ground, also known as reverse link):
    Calculating 3D position, velocity, and radial velocity of the aircraft relative to the one or more ground stations receiving on the uplink, based on one or more of the following:
        Information received from the ground station regarding the availability of one or more neighboring network nodes and associated location coordinates
        Predefined network map available at the node at the air
    Using the relative 3D information as a basis for steering a set of transmission beams towards the one or more ground stations receiving on the uplink
    Using the radial velocity as a basis for computing Doppler shift, and then, before transmitting on the uplink, modifying a signal to be transmitted by compensating for the expected Doppler shift (i.e., pre-compensation to maintain orthogonality in case of multiple aircraft are sharing the beam)
With respect to handover operations:
    Receiving an RRC connection reconfiguration message that includes information indicating the location(s) of ground station(s) for transmission and reception, respectively
    Optionally, using network location maps (available at the node in the air) for look-up of location coordinates associated with a target cell (i.e., a cell that is to take over responsibility for the ongoing communications as a result of handover from a serving cell)
    Using location information of ground stations when adapting beams and compensating for Doppler shift on downlink and uplink, respectively The functionality performed by the aircraft-mounted equipment may further comprise:
Synchronization source:
    Using GNSS (or other satellite-based navigation/positioning system) as a synchronization source for the airborne communications equipment, thereby avoiding wrap-around in automatic frequency correction based on transmitted downlink signal
Beam steering:
    Using information about aircraft location and flight path/track to determine the direction to the ground station from the aircraft
    Using information about fuselage orientation around the roll, pitch and yaw axes (i.e., aircraft attitude) to compensate for antenna orientation in the beam steering operations Functionality Performed by Ground Station These aspects are embodied in the form of technology (e.g., methods and/or corresponding equipment) for interference reduction in a terrestrial network node providing a wireless backhaul to aircraft. Other aspects provide improvements in the handling of handover of ongoing communications. In overview, the methodology comprises:

For transmission to aircraft in the downlink direction (i.e., the direction from ground to air, also known as forward link)
    Calculating 3D position of the ground station relative to the one or more aircraft receiving on the downlink, the positions being determined by detecting ADS-B broadcasts from the aircraft
    Determining whether one or more aircraft are to be served by the same beam, and splitting spectral and/or temporal resources correspondingly
    Using the relative 3D position as a basis for steering a set of transmission beams towards the one or more aircraft receiving on the downlink. Note: no Doppler shift pre-compensation is performed in order to maintain orthogonality between the transmitted signals
For reception in the uplink direction (i.e., the direction from air to ground, also known as reverse link)
    Calculating position of the ground station relative to the one or more aircraft transmitting on the uplink, the current positions being determined by detecting ADS-B broadcasts from aircraft (i.e., prediction-based tracking), or an equivalent data source transmitted by the aircraft providing information such as position, altitude, ground speed etc. from which the aircraft track may be predicted.
    Using the relative position as a basis for steering a set of reception beams towards the one or more aircraft transmitting on the uplink. No Doppler shift compensation is performed in order to maintain orthogonality in received signals. Doppler shift is instead handled by pre-compensation applied by the FTS.
With respect to handover operations:
    The source ground station determining that one or more aircraft are to be handed over to another ground station.
        The determination may be based on the velocity of the aircraft, the direction of mobility of the air vehicle, and the locations of the aircraft, source ground station and/or target ground station.
        Providing location information of the one or more target ground stations to the airborne communications equipment.

The description will now focus on embodiments of various components that carry out at least some of the functions described above and further below.

Figure 3:
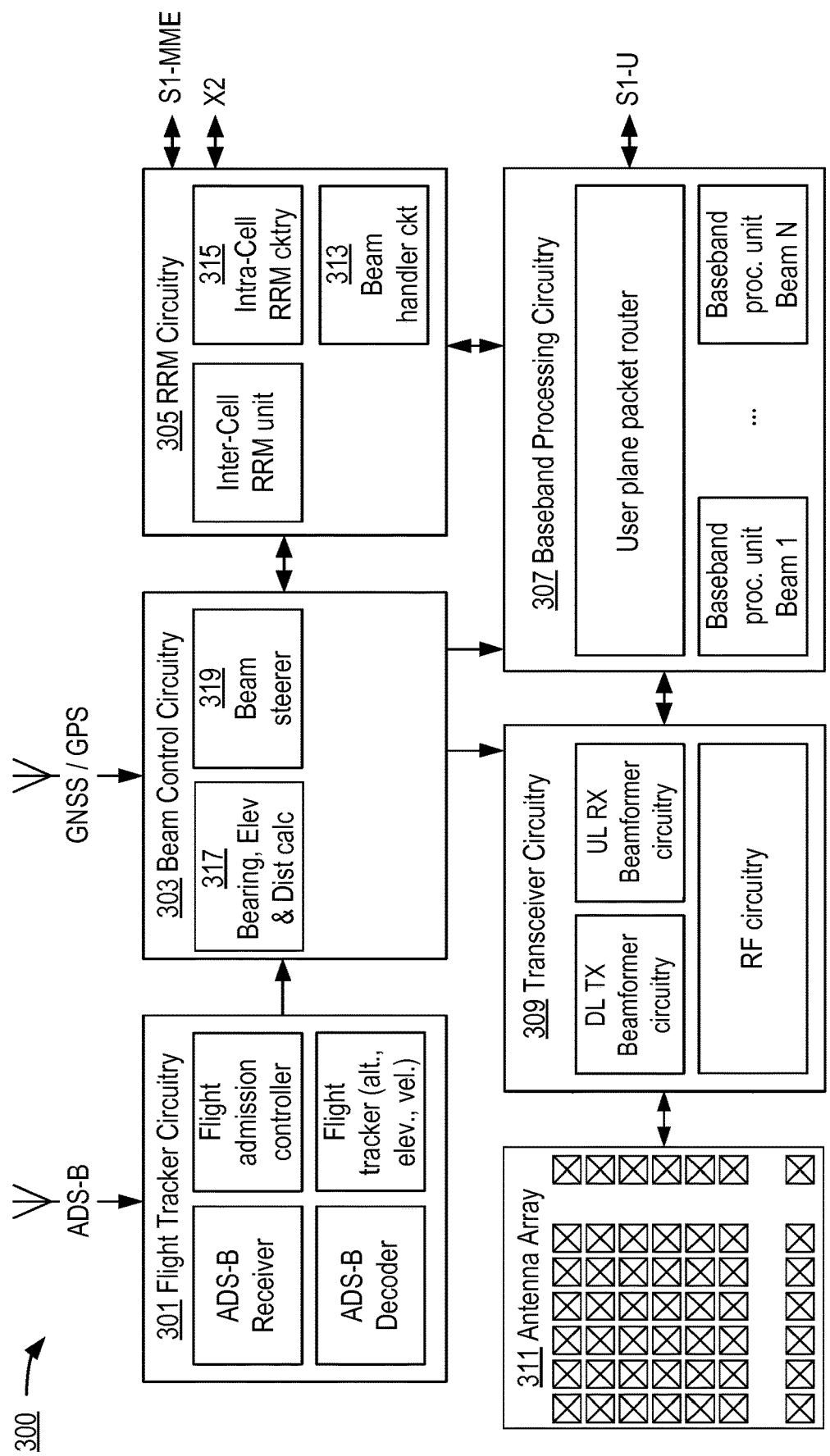
FIG. 3 depicts an exemplary embodiment of an apparatus configured to carry out ground station aspects of the invention.

FIG. 3 depicts an exemplary embodiment of a ground station (terrestrial transceiver point) 300 configured to carry out aspects of the invention. The exemplary ground station 300 can be installed as part of a base station (or other network node). For clarity, other components of the base station (or other network node) that are conventional and not relevant to aspects of the invention are not depicted.

The ground station 300 comprises Flight Tracker circuitry (FT) 301 responsible for tracking airplanes, Beam Control circuitry (BC) 303 responsible for calculating beamforming weights and/or beam control parameters, Radio Resource Management (RRM) circuitry 305 responsible for resource allocation, a Baseband Processing unit (BP) 307 responsible for baseband processing (whole stack L1-L3) and capable of processing a number, N, of communication links in parallel where each link comprises at least one uplink and one downlink beam, Transceiver circuitry (TC) 309 responsible for shaping up to N sets of beams, each being used for downlink transmissions, and combining the input from receive antennas into N communication links. Moreover, there is at least one antenna array node 311 with at least N+1 antenna elements. The N communication links are separated spatially, but overlap each other in time and frequency (spatial diversity similar to Multi-User Multiple Input Multiple Output—"MU-MIMO").

In some alternative embodiments, adjustment of elevation and/or bearing may comprise physically changing the position of each antenna node, such as changing tilt and/or orientation to follow the aircraft. In yet other embodiments it may be a combination of physical node position change with modification of amplitude and/or phase of the signals received or transmitted by different antenna elements. Moreover, usage of multiple antenna nodes by one ground station 300 is not precluded.

The Flight Tracker Circuitry 301 tracks the aircraft and predicts, based on the last K position observations at the position fix time instants $t_{-k}$, $k \in \{0, 1, \ldots, K-1\}$, where the aircraft will be at time t1. Any deviation between the actual reported position at t1 and the predicted position at t1 is fed back to the prediction model and used to tune the prediction weights. This aspect is discussed further below in connection with FIG. 7. Besides predicting position, the Flight Tracker circuitry 301 also predicts heading and velocity over ground.

The Beam Control circuitry 303, RRM circuitry 305, Baseband Processing circuitry 307, and Transceiver circuitry 309 themselves include various circuit components as shown in FIG. 3.

The Beam Handler circuitry 313 in the RRM circuitry 305 decides, based on the directions from the TTP(s) to each respective FTS, whether multiple FTSs are to be served by the same beam. If so, the Intra-cell RRM circuitry 315 takes this into account in the scheduling (resource allocation) of the physical resources. In case multiple FTSs are to be served by the same beam, those have to share the resources (e.g. the available PRBs).

In the case of re-use of terrestrial carrier frequencies, by which some users on the ground might be served on the same carrier frequency is being used in the A2G link, the Intra-cell RRM circuitry 315 might reserve certain resources or certain subbands for those terrestrial users, and hence exclude those resources from the MU-MIMO operation. The rationale is that it is desirable to avoid interference due to scattering of signals transmitted from the FTS to the ground station.

A Calculator 317 in the Beam Control Circuitry 303 determines bearing, elevation, and distance to the aircraft, and the Beam Steerer 319, comprised in the Beam Control Circuitry 303, uses these values as a basis for directing beams accordingly. This aspect is discussed further below in connection with FIG. 8. In some embodiments the beam steering may also include adjusting the transmission (TX) power of the downlink transmit beam in order to reduce interference in the air space. The TX power adjustment can be determined by considering a propagation path loss function and the distance between the TTP and the FTS.

Figure 4:
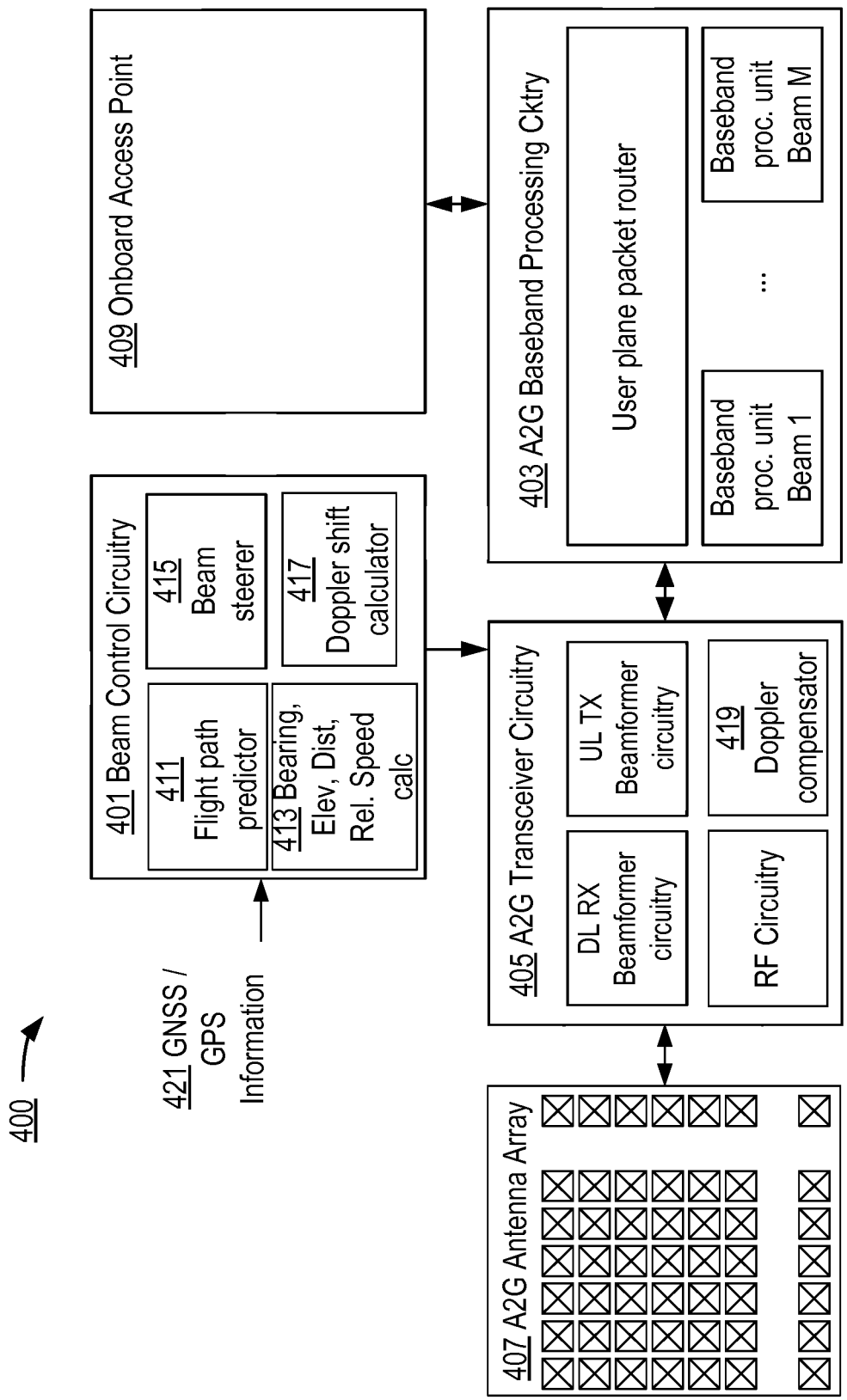
FIG. 4 depicts an exemplary embodiment of an apparatus configured to carry out flight transceiver station aspects of the invention.

FIG. 4 depicts an exemplary embodiment of an FTS 400 configured to carry out aspects of the invention. The exemplary FTS 400 can be installed on an aircraft. For clarity, other components of the FTS that are conventional and not relevant to aspects of the invention are not depicted.

The FTS 400 comprises Beam Control Circuitry 401, an A2G Baseband Processing Circuitry 403 (capable of handling several active beams), an A2G Transceiver Circuitry 405, an A2G Antenna Array 407, and an Onboard Access Point (AP) 409. The Onboard Access Point 409 may be based on any of the current or future 3GPP standards, Wifi, or some new system. Users onboard the aircraft connect to the AP and their traffic is then trunked and passed over the wireless A2G backhaul link.

The Beam Control Circuitry 401 contains a Flight Path Predictor 411, a direction and relative speed calculator 413, a Beam Steerer 415, and a Doppler Shift Calculator 417. In some embodiments, the Beam Control Circuitry 401 receives 421 information about the position of the FTS 400 directly or indirectly by means of information obtained from a global navigation satellite system. The Flight Path Predictor 411 has similar functionality as described with respect to the Flight Tracker Circuitry 301 found in the ground station 300, except that it calculates directions and radial velocity to the TTP(s) (e.g., as vector operations in the Euclidean space). This aspect is discussed further below in connection with FIG. 7. The information produced and supplied by the Flight Path Predictor 411 is used by the Beam Steerer 415 for steering the beams (output from the A2G Antenna Array 407) towards the TTP(s). That information is also used by the Doppler Shift Calculator 417.

Figure 5A:
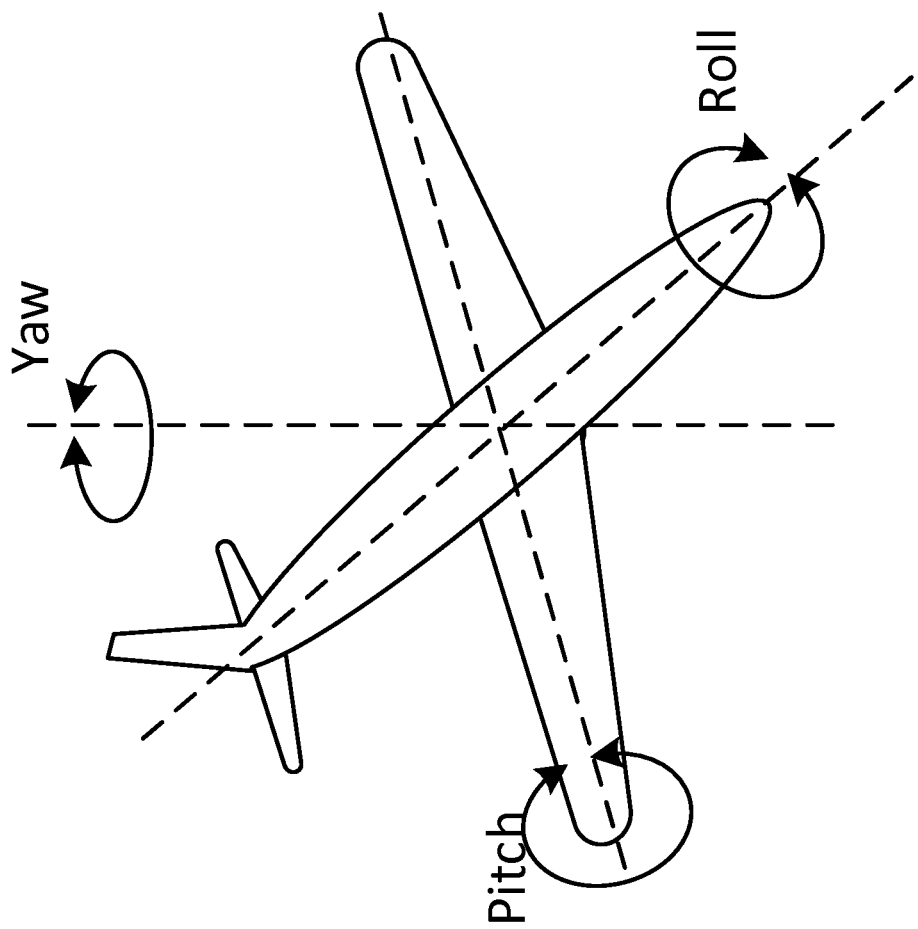
FIGS. 5A and 5B depict aircraft attitude, and impact on beam steering, respectively.
Figure 5B:
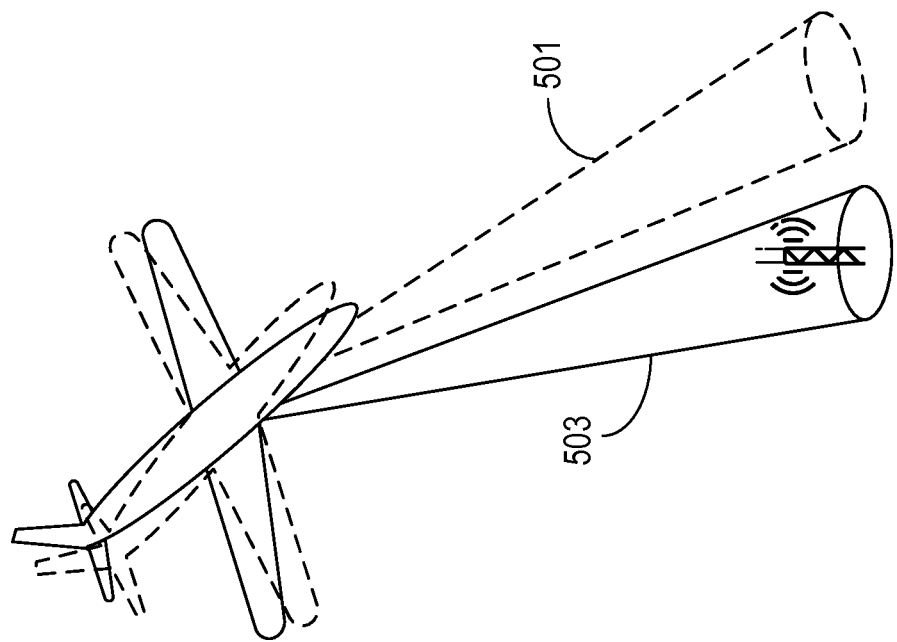

Additional aspects of embodiments consistent with the invention will now be described, first with reference to FIGS. 5A and 5B, which depict aircraft attitude, and impact on beam steering, respectively. As shown in these figures, the aircraft's attitude may cause the beam to be steered in a direction 501 other than intended 503, unless compensated for. Information about the attitude of the aircraft is needed to calculate the appropriate compensation, and this information can come from the flight manager system or may be determined by the FTS itself by use of gyroscopes etc. A Doppler Shift Calculator 417 is comprised in the Beam Control Circuitry 401, where it has access to GNSS/GPS information, information about the predicted flight path, and coordinates of the ground station. Circuitry for calculating and applying the necessary Doppler compensation is comprised in the A2G Transceiver Circuitry 405.

With the heading, i.e. the direction in which the fuselage is pointing, as a reference, expressed in Cartesian coordinates the impact of attitude can be described via rotation matrices $$R_X = \begin{bmatrix} \cos(\alpha) & 0 & -\sin(\alpha) \\ 0 & 1 & 0 \\ \sin(\alpha) & 0 & \cos(\alpha) \end{bmatrix},$$

$$R_Y = \begin{bmatrix} 1 & 0 & 0 \\ 0 & \cos(\beta) & -\sin(\beta) \\ 0 & \sin(\beta) & \cos(\beta) \end{bmatrix}, \text{ and}$$

$$R_Z = \begin{bmatrix} \cos(\gamma) & \sin(\gamma) & 0 \\ -\sin(\gamma) & \cos(\gamma) & 0 \\ 0 & 0 & 1 \end{bmatrix}$$

for roll of angle α, pitch of angle β, and yaw of angle γ. Hence if the track is $[x\ y\ z]^T$ the orientation of the fuselage is $[x'\ y'\ z']^T = R_X R_Y R_Z [x\ y\ z]^T$. Since the FTS 400 is attached to the fuselage, the attitude impacts the perception of directions and hence needs to be accounted for in the beam steering. It shall be noted that the attitude does not impact the distance between the FTS and the TTP, nor does it impact the Doppler shift.

Moreover, the TX timing and the TX power may be adjusted when the distance between the FTS 400 and the at least one TTP changes. One rationale for reducing TX power when the distance decreases is to avoid causing excessive interference in the terrestrial network (particularly if terrestrial frequencies are reused for the A2G communication). Another rationale is to avoid high power interference being scattered back up into the air, potentially causing interference for other FTSs served by other beams.

Figure 6:
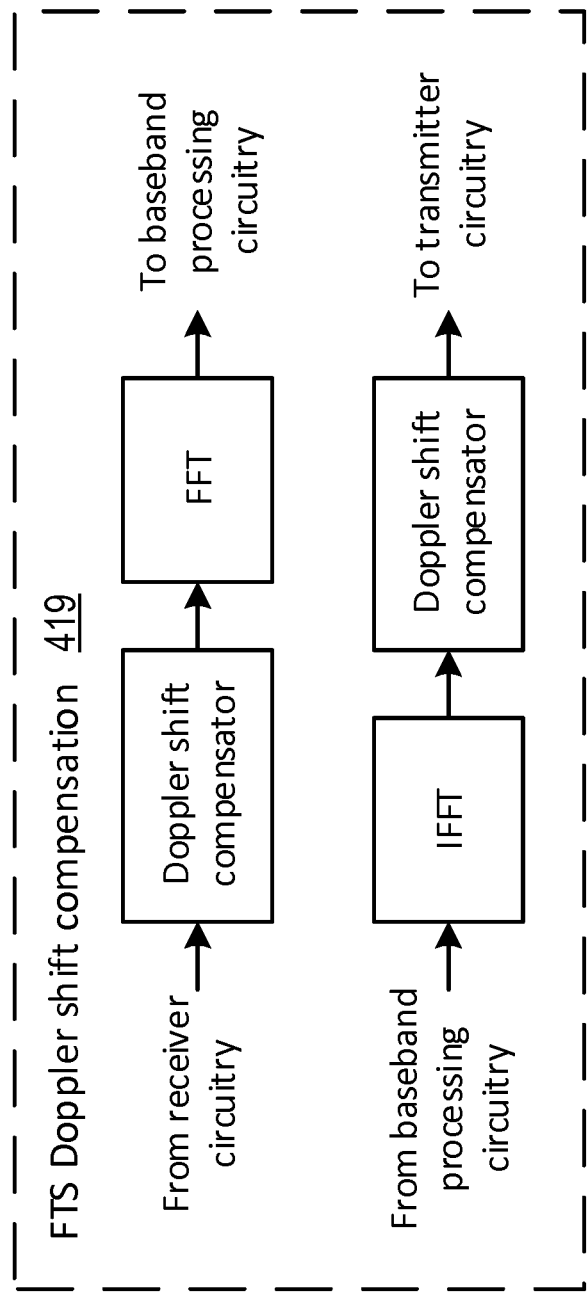
FIG. 6 depicts exemplary embodiments of FTS equipment relating to Doppler shift compensation.

Referring back briefly to FIG. 4, it can be seen that the A2G Transceiver Circuitry 405 includes a Doppler compensator 419. This will now be described with reference to FIG. 6. As illustrated in the figure, Doppler shift compensation is applied by the FTS 400 before processing the received downlink signals (post-compensation), and before transmitting uplink signals (pre-compensation). The benefit of this is that when several FTSs share the same beam, the signals transmitted on the uplink will still be orthogonal to each other when received by the TTP because there is no inter-carrier interference introduced in the processing on the TTP side. Had different FTSs transmitted signals that were received with different frequency shifts, inter-carrier leakage would result when transforming the received signals using FFTs on the TTP side.

Figure 9:
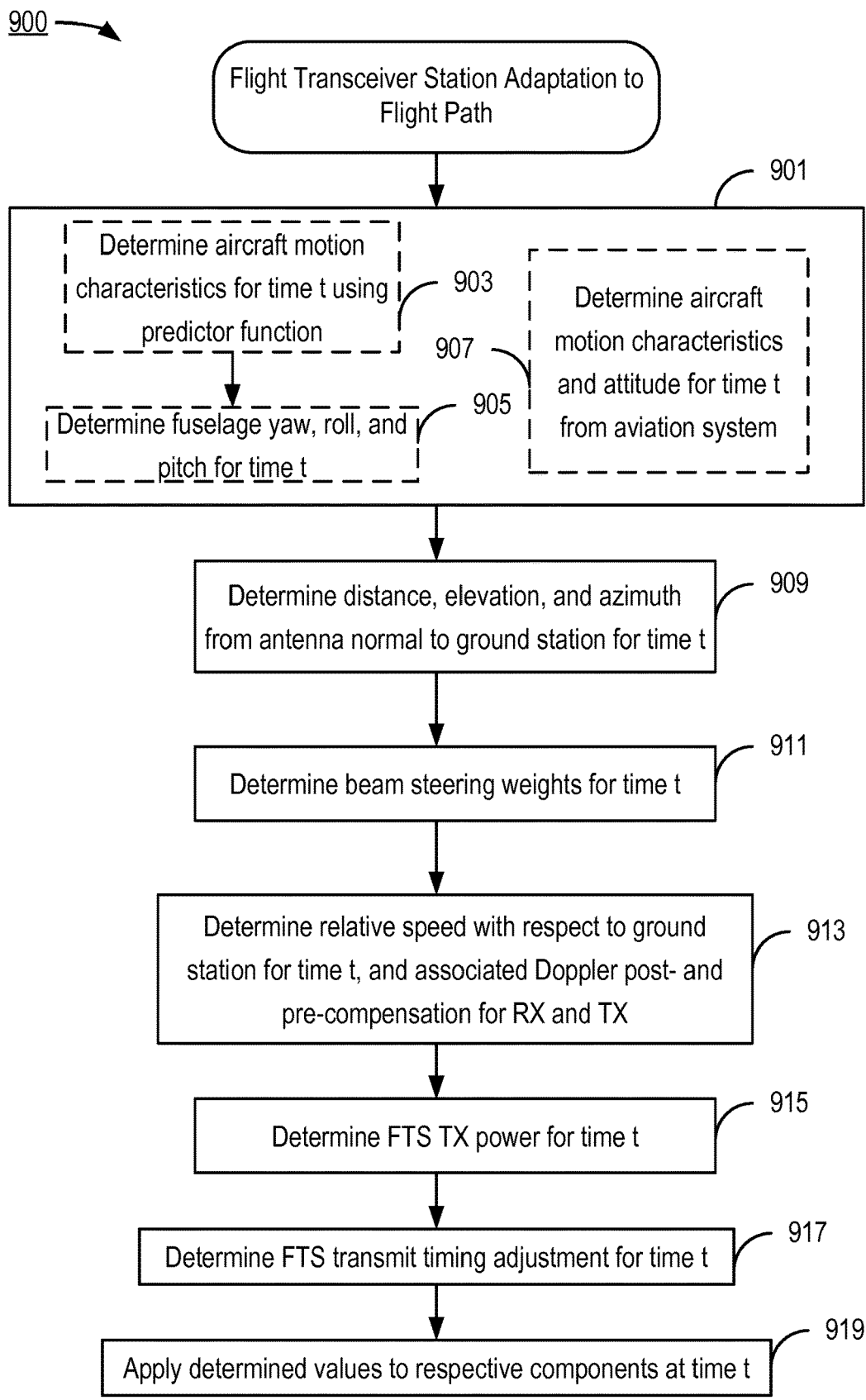
FIG. 9 is, in one respect, a flow chart of steps/processes performed by an FTS to adapt the orientation of the beam and other transmission characteristics to the flight path of the aircraft.

The steps taken by the FTS 400 are illustrated further in FIG. 9. As mentioned there are alternatives with respect to how the FTS 400 acquires the attitude and other flight-related information, and this is discussed further below. The aviation system is also referred to as Flight Manager.

Doppler shift compensating values are calculated as $\Delta f\_DL = -v/c \cdot f\_DL$ for the downlink and $\Delta f\_UL = -v/c \cdot f\_UL$ for the uplink, with c being the speed of light, $f\_DL$ the downlink carrier frequency, $f\_UL$ the uplink carrier frequency, and v the radial velocity of the FTS towards the TTP. This radial velocity depends on the trajectory along which the aircraft (and hence also the FTS) is moving, the position of the aircraft (and hence also the FTS), and the positions of the TTPs.

Doppler compensation may be realized as a frequency modulation of the received signal, or of the signal to be transmitted.

Further aspects of embodiments will now be described with reference to FIG. 7, which in one respect is a flow chart of steps/processes performed by the Flight Tracker Circuitry 301 of the ground station 300, and by the Flight Path Predictor 411 of the FTS 400.

Figure 7:
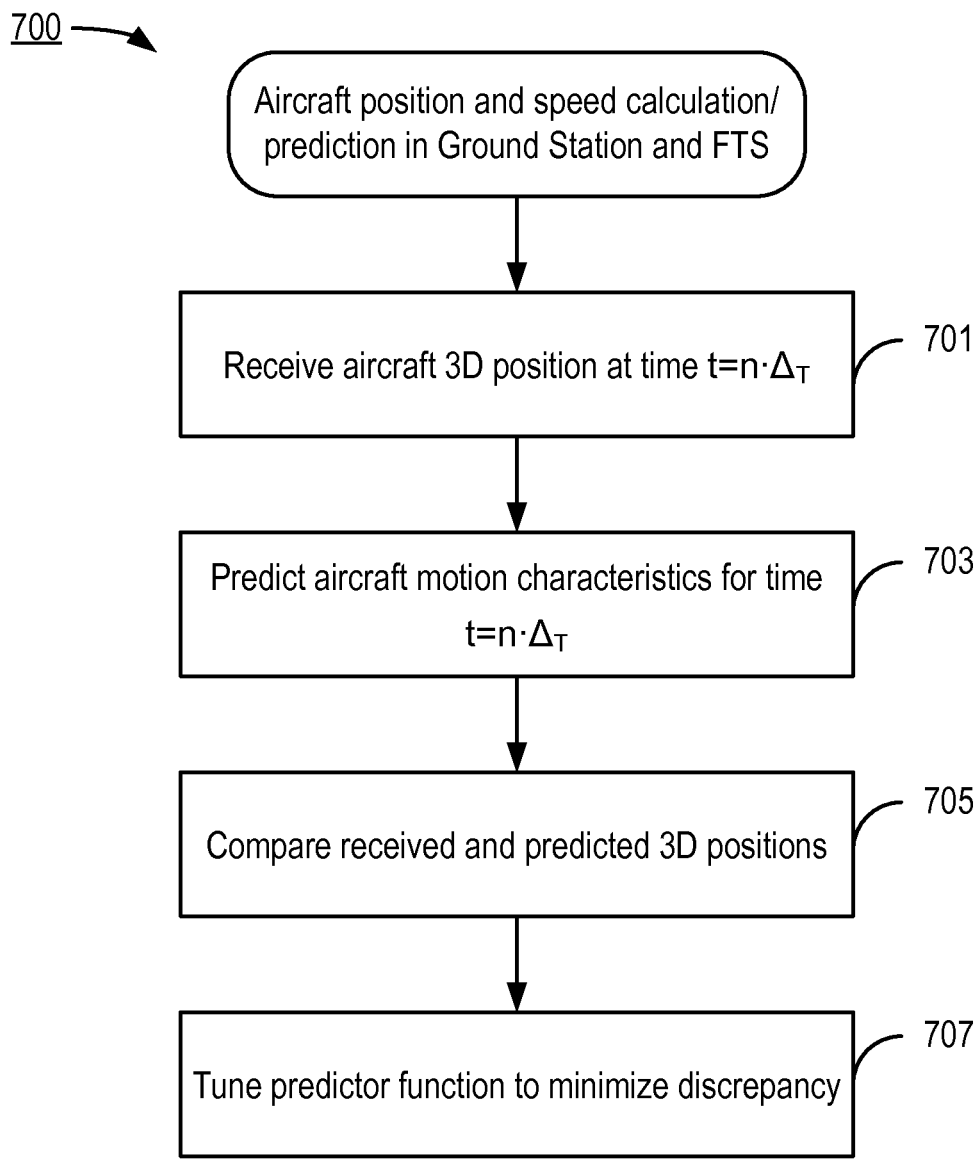
FIG. 7 is, in one respect, a flow chart of steps/processes performed by the Flight Tracker Circuitry of a ground station and by the Flight Path Predictor the FTS.

In another respect, FIG. 7 can be considered to depict exemplary means 700 comprising the various illustrated circuitry (e.g., hard-wired and/or suitably programmed processor) configured to perform the described functions.

The aircraft's actual positions are tracked by making observations of position at fixed time instants $t\_(-n)$, $n \in \{0, 1, \ldots, K-1\}$, with the fixed time instants being spaced apart from one another by a fixed amount, $\Delta_T$ (step 701). A prediction is made regarding what the aircraft's position and velocity over ground will be at a future moment in time, $t = n \cdot \Delta T$ (n is an integer), with the prediction being based on the last K observations of aircraft position (step 703). At the future moment in time, t, the aircraft's actual position is acquired and compared with the predicted position (step 705). Any deviation between the actual reported position at time t and the predicted position at time t is fed back to the prediction model and used to tune the prediction weights to improve accuracy (step 707).

Further aspects of embodiments will now be described with reference to FIG. 8, which in one respect is a flow chart of steps/processes performed by the Beam Steerer 319 of the Ground Station 300 to adapt the orientation of the beam to the flight path of the aircraft.

Figure 8:
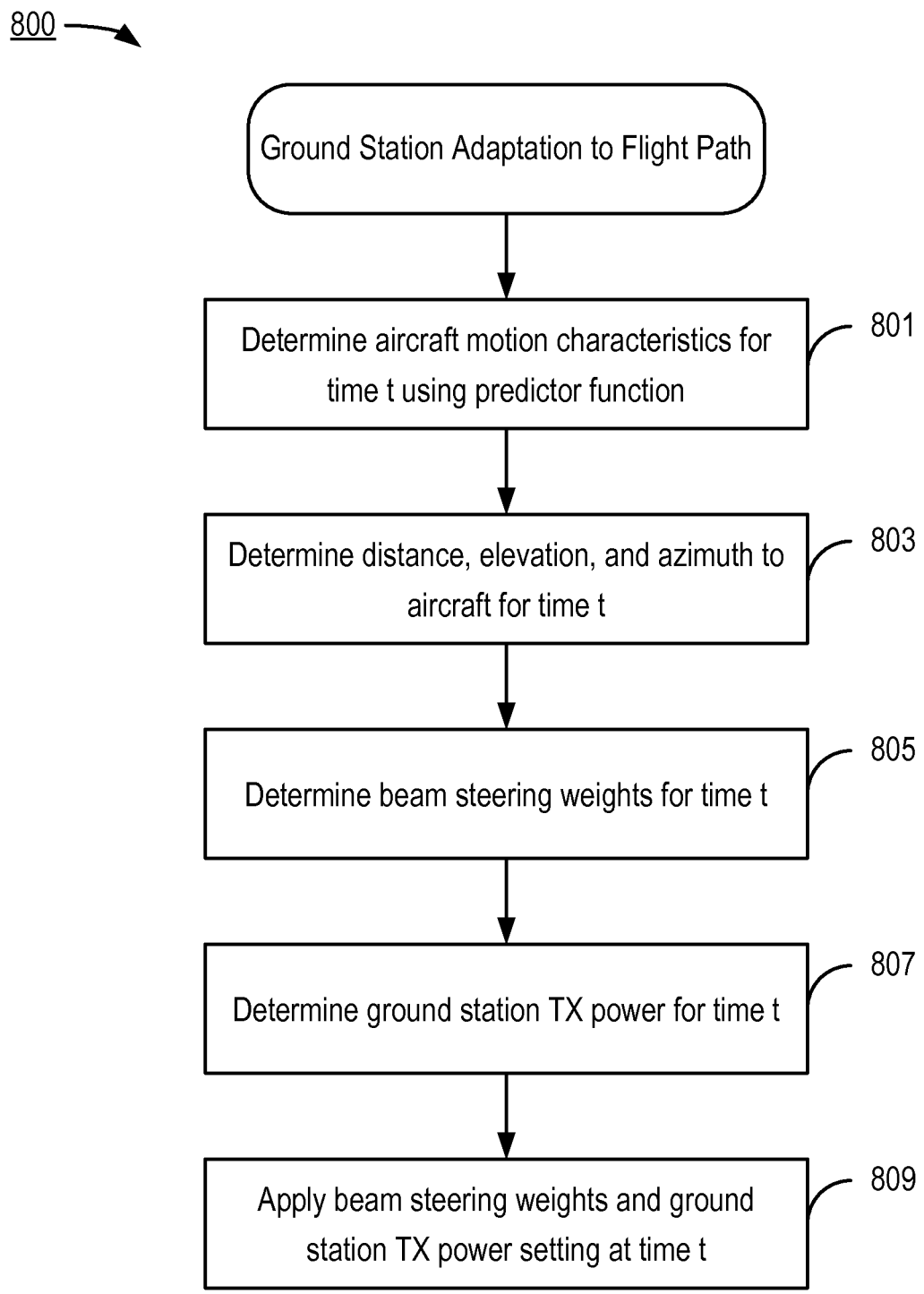
FIG. 8 is, in one respect, a flow chart of steps/processes performed by a Beam Steerer of a Ground Station to adapt the orientation of a beam to the flight path of the aircraft.

In another respect, FIG. 8 can be considered to depict exemplary means 800 comprising the various illustrated circuitry (e.g., hard-wired and/or suitably programmed processor) configured to perform the described functions.

The circuitry uses the predictor circuitry to determine motion characteristics of the aircraft for a time t (step 801). Then, it calculates the distance, elevation and azimuth to the airplane for the time t based on the prediction (step 803), and beam steering weights for the time t are determined accordingly (step 805). In some but not necessarily all embodiments, the circuitry further determines the ground station TX power for the time t (step 807). Finally, the determined beam steering weights and ground station TX power setting are applied at the time t. As mentioned earlier, adjusting the TX power of the downlink transmit beam is (optionally) performed in order to reduce interference in the air space. The TX power adjustment can be determined by considering a propagation path loss function and the distance between the TTP and the FTS.

Further aspects of embodiments will now be described with reference to FIG. 9, which in one respect is a flow chart of steps/processes performed by the FTS 400 to adapt the orientation of the beam and other transmission characteristics to the flight path of the aircraft.

In another respect, FIG. 9 can be considered to depict exemplary means 900 comprising the various illustrated circuitry (e.g., hard-wired and/or suitably programmed processor) configured to perform the described functions.

To achieve this functionality, the FTS 400 determines aircraft motion characteristics and attitude of the aircraft (and hence also of the FTS 400) (step 901). This can be done in any number of ways, and all are contemplated to be within the scope of embodiments consistent with the invention. In one example, aircraft motion characteristics for a time, t, are obtained from the above-described predictor function (step 903). Also, the fuselage yaw, roll, and pitch of the aircraft associated with the time, t, are obtained, e.g., from flight equipment typically found on an aircraft (step 905).

In another, alternative example, motion characteristics and attitude of the aircraft are obtained from the aircraft's own aviation system (step 907).

Using the information obtained in step 901, the FTS 400 determines distance, elevation, and azimuth from the antenna normal to the ground station, wherein these values are associated with the time t (step 909). These values are used to determine beam steering weights for the time t (step 911).

The FTS 400 additionally determines radial velocity with respect to the ground station for the time t, and uses this as a basis for determining associated Doppler post- and pre-compensation for reception and transmission, respectively (step 913).

The exemplary FTS 400 also uses, for example, distance information to determine FTS transmission power to be used at time t (step 915).

Also, the exemplary FTS 400 determines (step 917) a transmit timing adjustment to be used at time t (step 917).

The transmit timing adjustment, like the transmission power adjustment, can be based on a difference between the distance determined for the future moment in time t, and a corresponding distance determined at a time of a previous transmit timing adjustment and/or a previous transmit power level adjustment.

At or after the future moment in time t, the variously determined/predicted values are applied to their respective FTS components (step 919).

Other aspects of some embodiments consistent with the invention relate to improvements in the way handover of ongoing communications from a serving cell to a target cell are carried out. An exemplary embodiment will now be described with reference to FIG. 10, which in one respect is a flow chart of steps/processes performed by the FTS 400 as part of handover functionality.

Figure 10:
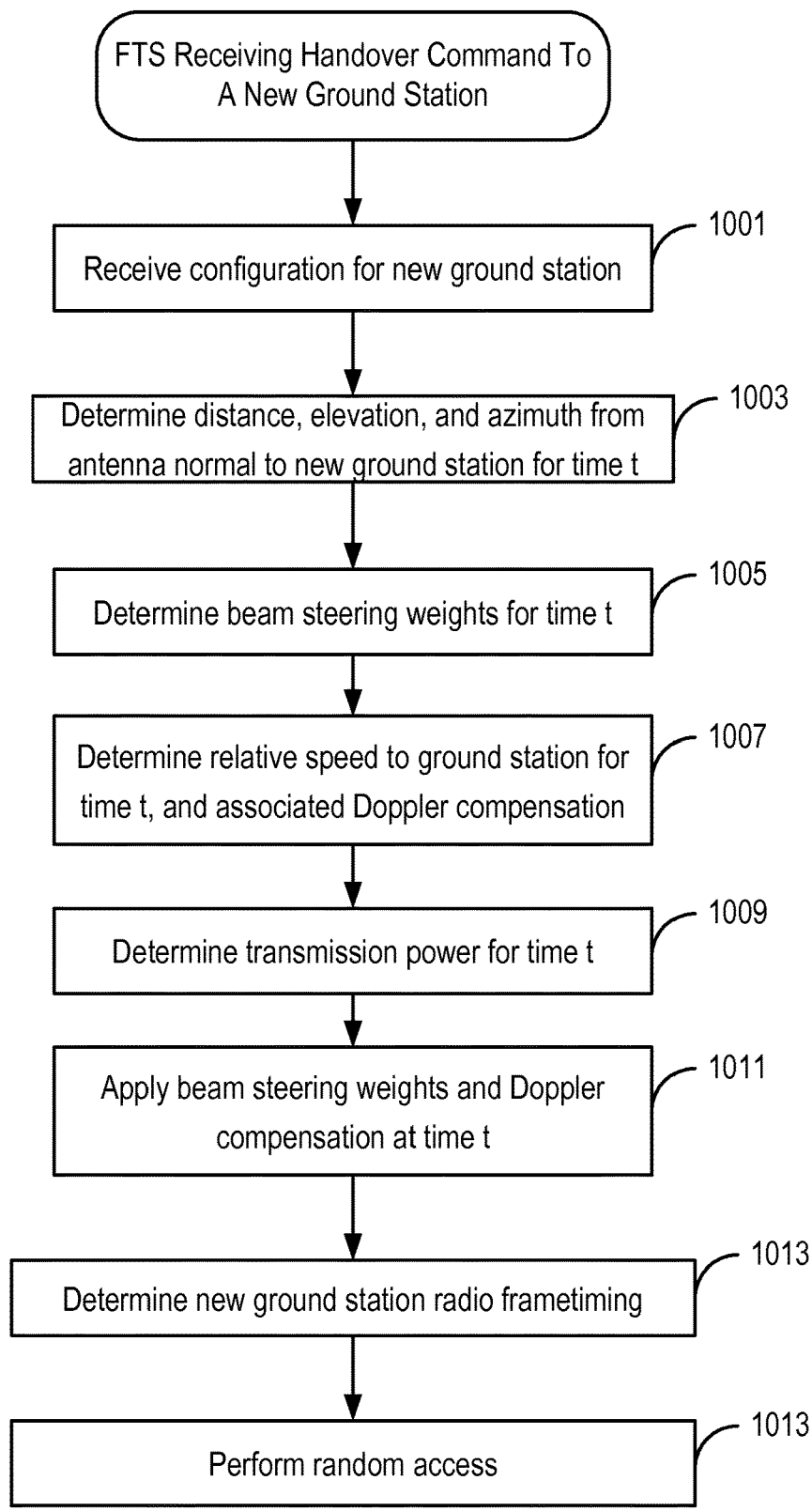
FIG. 10 is, in one respect, a flow chart of steps/processes performed by the FTS as part of handover functionality.

In another respect, FIG. 10 can be considered to depict exemplary means 1000 comprising the various illustrated circuitry (e.g., hard-wired and/or suitably programmed processor) configured to perform the described functions.

When the UE (in this context, the FTS 400) is to be handed over from the serving cell (source set of TTPs) to a new set of TTPs (target set of TTPs), it receives a handover command (also known as "RRC connection reconfiguration" in LTE-compliant systems), which also contains location coordinates for the target set of TTPs (step 1001). The FTS 400 determines, in association with a time t, the directions (relative to antenna normal) and radial velocities to the target set of TTPs, also taking into account FTS attitude (roll, pitch, yaw) when determining the beam direction (step 1003). These values are used as a basis for determining beam steering weights for the time t (step 1005).

From the radial velocity between the aircraft and the target set of TTPs, the FTS 400 determines the Doppler compensation that will be needed on the uplink and downlink, respectively (step 1007).

The FTS 400 also determines a suitable transmission power level to use during the random access to the target set of TTPs (step 1009). This transmission power setting may depend on the distance between the FTS and the target TTPs, under the assumption of a propagation loss model such as Friis' formula for free space propagation.

At the time t, the FTS 400 applies the various determined values to control its transmissions; e.g., the beam steering weights and Doppler compensation are applied to the transceiver equipment (step 1011).

The FTS 400 tunes in to the target set of TTPs and determines the downlink frame timing, from which it can determine a suitable uplink transmit timing to use when it carries out random access (step 1013).

Random access to the target set of TTPs is then performed (step 1013).

In another aspect of some embodiments, the FTS 400 receives a handover command comprising a cell identity of the target cell (as in legacy systems), and the FTS consults a stored table to look up the coordinates of the target set of TTPs.

Figure 11:
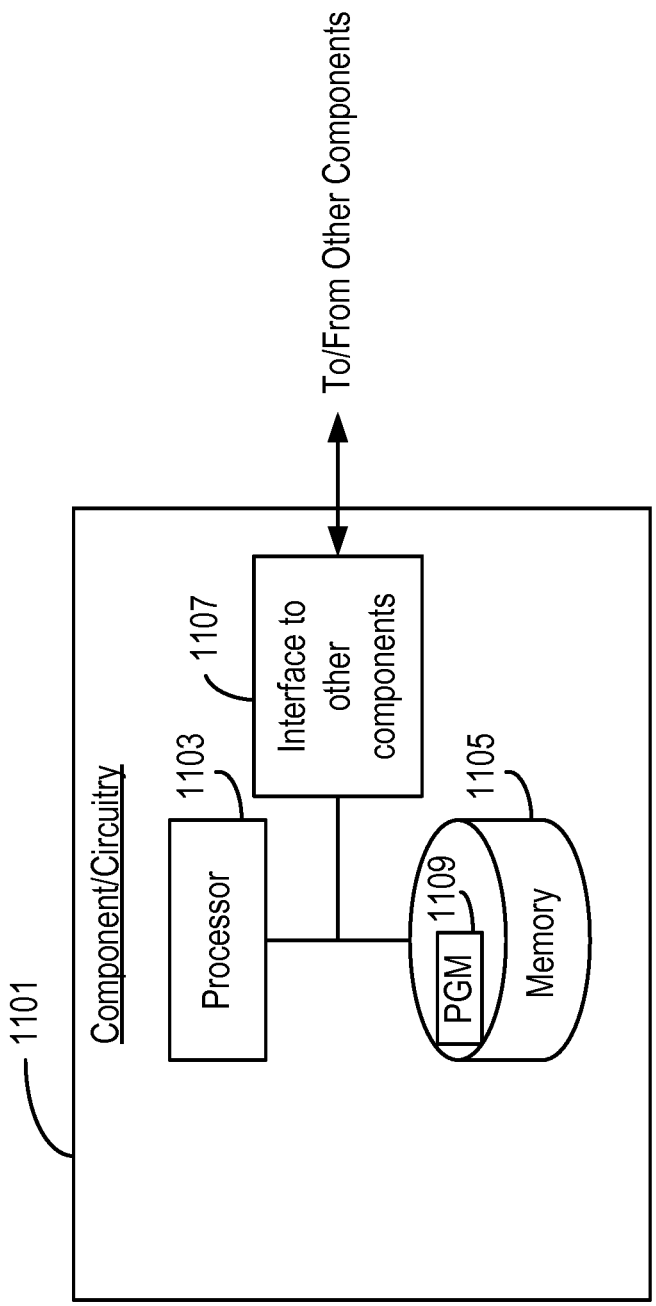
FIG. 11 is a block diagram of elements of a component for carrying out various aspects of the invention as described herein, such as in connection with FIGS. 3, 4, 6, 7, 8, 9, and 10.

Looking at further aspects of embodiments consistent with the invention, FIG. 11 is a block diagram of elements of a component for carrying out various aspects of the invention as described above, such as in connection with FIGS. 3, 4, 6, 7, 8, 9, and 10. In particular, a component 1101 (e.g., any of the components/circuitry illustrated in FIGS. 3 and 4, or any of the functional elements illustrated in FIGS. 6 through 10) includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 11, however, is programmable circuitry, comprising a processor 1103 coupled to one or more memory devices 1105 (e.g., Random Access Memory, Magnetic Disc Drives, Optical Disk Drives, Read Only Memory, etc.) and to an interface 1107 that enables bidirectional communication with other components in the system. The memory device(s) 1105 store program means 1109 (e.g., a set of processor instructions) configured to cause the processor 1103 to control other node elements so as to carry out any of the aspects described above, such as but not limited to those described with reference to FIGS. 3, 4, 6, 7, 8, and 9. The memory device(s) 1105 may also store tables and data (not shown) representing various constant and variable parameters as may be needed by the processor 1103 and/or as may be generated when carrying out its functions such as those specified by the program means 1109.

In yet other aspects, it is noted that the FTS utilizes information about the positions of the one or more TTPs with which it is communicating. In some embodiments, the FTS obtains this position information via a control plan communication to the FTS. In some alternative embodiments, the information about the positions of the TTPs is obtained via a user plane communication to the FTS. In in still some other alternative embodiments, the information about the positions of the TTPs is obtained via a pre-loaded data storage component in the flight transceiver station.

In another aspect of some but not necessarily all embodiments, the FTS's computing the radial velocities between the FTS and the one or more TTPs is computed as a change in respective Euclidean distances between the FTS and the one or more TTPs during an interval of time. In some but not necessarily all alternative embodiments, the FTS computes the radial velocities between the FTS and the one or more TTPs as scalar products between the velocity of the FTS and the respective directions to the one or more TTPs.

In another aspect of some but not necessarily all embodiments, the FTS predicts the flight path of the aircraft using a regression model that is based on past 3-dimensional positions of the FTS at a plurality, N, of past times and that extrapolates the velocity and 3-dimensional positions of the FTS to obtain the position of the FTS in 3-dimensional space at the future moment in time t.

The technology described herein provides advantages over conventional technology. In one example, transmitting narrow beams from the FTS limits the interference levels at ground level. This is particularly so for the case when terrestrial operator frequencies are reused for the A2G backhaul.

Also, by applying pre-compensation of Doppler shift on the uplink (direction from air to ground, reverse link), and post-compensation of Doppler shifts on the downlink (direction ground to air, forward link) one can maintain orthogonality among the users (i.e., FTSs sharing resources in the same set of beams), and also to users on the ground, thus allowing some physical resources to be safeguarded for terrestrial users and which would otherwise be interfered with by scattered signals from the FTSs.

And in another example, by informing the FTS about the location of the target cell during the handover, the FTS can swiftly direct its set of beams towards the target TTP(s). Moreover, the above-described technology allows the operator to have full control of the mobility because the solution is not dependent on preloaded information which may get corrupted, outdated, or tampered with.

In another example, embodiments in which the FTS performs both beamsteering and Doppler shift pre-compensation provide an efficiency and/or synergy in that the same information about position of the aircraft (and hence also of the FTS) can be used to derive both the beamsteering weights (i.e., direction of the beams) and also the radial velocity for determining the Doppler shift pre-compensation.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is further illustrated by the appended claims, rather than only by the preceding description, and all variations and equivalents which fall within the range of the claims are intended to be embraced therein.

What is claimed is:

1. A method of communicating with one or more terrestrial transceiver points by a flight transceiver station mounted onboard an aircraft, the method comprising:
   the flight transceiver station performing:
   determining, for a future moment in time t, a position of the flight transceiver station in 3-dimensional space;
   determining, for the future moment in time t, an attitude of the flight transceiver station;
   determining, for the future moment in time t, one or more respective directions from the position of the flight transceiver station to the one or more terrestrial transceiver points;
   determining, for the future moment in time t, respective radial velocities between the flight transceiver station and the one or more terrestrial transceiver points;
   determining, based on the respective directions and attitudes, beamforming weights for one or more transmit beams towards each of the one or more terrestrial transceiver points;
   predicting, based on the respective radial velocities, respective Doppler shifts of a carrier frequency used between the flight transceiver station and the one or more terrestrial transceiver points;
   applying to transmitter equipment of the flight transceiver station, at the future moment in time t:
     the beamforming weights for the one or more transmit beams; and
     a Doppler pre-compensation based on the predicted Doppler shifts.

2. The method of claim 1, further comprising:
   determining, based on the respective directions and attitudes, beamforming weights for one or more reception beams towards each of the one or more terrestrial transceiver points;
   applying to receiver equipment of the flight transceiver station, at or following the future moment in time t:
   the beamforming weights for the one or more reception beams; and
   a Doppler post-compensation based on the predicted Doppler shifts.

3. The method of claim 1, further comprising:
   determining, for the future moment in time t, respective distances between the flight transceiver station and each of the one or more terrestrial transceiver points;
   determining a transmit power level adjustment for each of the one or more transmit beams based on a difference between the distance determined for the future moment in time t, and a corresponding distance determined at a time of a previous transmit power level adjustment; and
   applying to transmitter equipment of the flight transceiver station, at the future moment in time t, the determined transmit power level adjustment.

4. The method of claim 3, wherein determining the transmit power level adjustment comprises:
   determining differences in respective distances between the flight transceiver station and the one or more terrestrial transmission points between the previous transmit timing adjustment and the future moment in time t; and
   calculating, based on a propagation loss model for electromagnetic waves, a change in propagation loss resulting from the determined differences in respective distances.

5. The method of claim 1, further comprising:
   determining, for the future moment in time t, respective distances between the flight transceiver station and each of the one or more terrestrial transceiver points;
   determining a transmit timing adjustment for each of the one or more transmit beams based on a difference between the distance determined for the future moment in time t, and a corresponding distance determined at a time of a previous transmit timing adjustment; and
   applying to transmitter equipment of the flight transceiver station, at the future moment in time t, the determined transmit timing adjustment.

6. The method of claim 5, wherein determining the transmit timing adjustment comprises:
   determining differences in respective distances between the flight transceiver station and the one or more terrestrial transmission points between the previous transmit timing adjustment and the future moment in time t; and
   calculating, based on line-of-sight propagation conditions, a propagation time difference resulting from the determined differences in respective distances.

7. The method of claim 1, wherein the position of the flight transceiver station in 3-dimensional space is determined directly or indirectly by means of information obtained from a global navigation satellite system and a prediction of a flight path of the aircraft.

8. The method of claim 1, wherein the attitude of the flight transceiver station is provided by a flight manager system.

9. The method of claim 1, wherein the attitude of the flight transceiver station is determined by sensors that are a part of the flight transceiver station.

10. The method of claim 1, wherein the attitude of the flight transceiver station is determined using gyroscopes.

11. The method of claim 1, wherein the method is performed as part of a handover process.

12. The method of claim 11, comprising:
   receiving configuration information about one or more handover target terrestrial transceiver points.

13. A flight transceiver station configured to communicate with one or more terrestrial transceiver points while mounted onboard an aircraft, the flight transceiver station comprising:
   beam control circuitry configured to:
     determine, for a future moment in time t, a position of the flight transceiver station in 3-dimensional space;
     determine, for the future moment in time t, an attitude of the flight transceiver station;

determine, for the future moment in time t, one or more respective directions from the position of the flight transceiver station to the one or more terrestrial transceiver points;

determine, for the future moment in time t, respective radial velocities between the flight transceiver station and the one or more terrestrial transceiver points;

determine, based on the respective directions and attitudes, beamforming weights for one or more transmit beams towards each of the one or more terrestrial transceiver points; and predict, based on the respective radial velocities, respective Doppler shifts of a carrier frequency used between the flight transceiver station and the one or more terrestrial transceiver points; and transceiver circuitry configured to apply, at the future moment in time t:

the beamforming weights for the one or more transmit beams; and a Doppler pre-compensation based on the predicted Doppler shifts.

14. The flight transceiver station of claim 13, wherein:

the beam control circuitry is further configured to determine, based on the respective directions and attitudes, beamforming weights for one or more reception beams towards each of the one or more terrestrial transceiver points; and the transceiver circuitry is further configured to apply, at or following the future moment in time t:

the beamforming weights for the one or more reception beams; and a Doppler post-compensation based on the predicted Doppler shifts.

15. The flight transceiver station of claim 13, wherein the flight transceiver station is further configured to:

determine, for the future moment in time t, respective distances between the flight transceiver station and each of the one or more terrestrial transceiver points;

determine a transmit power level adjustment for each of the one or more transmit beams based on a difference between the distance determined for the future moment in time t, and a corresponding distance determined at a time of a previous transmit power level adjustment; and apply to transmitter equipment of the flight transceiver station, at the future moment in time t, the transmit power level adjustment.

16. The flight transceiver station of claim 15, wherein determining the transmit power level adjustment comprises:

determining differences in respective distances between the flight transceiver station and the one or more terrestrial transmission points between the previous transmit power level adjustment and the future moment in time t; and calculating, based on a propagation loss model for electromagnetic waves, a change in propagation loss resulting from the determined differences in respective distances.

17. The flight transceiver station of claim 13, wherein the flight transceiver station is further configured to:

determine, for the future moment in time t, respective distances between the flight transceiver station and each of the one or more terrestrial transceiver points;

determine a transmit timing adjustment for each of the one or more transmit beams based on a difference between the distance determined for the future moment in time t, and a corresponding distance determined at a time of a previous transmit timing adjustment; and apply to transmitter equipment of the flight transceiver station, at the future moment in time t, the determined transmit timing adjustment.

18. The flight transceiver station of claim 17, wherein determining the transmit timing adjustment comprises:

determining differences in respective distances between the flight transceiver station and the one or more terrestrial transmission points between the previous transmit timing adjustment and the future moment in time t; and calculating, based on line-of-sight propagation conditions, a propagation time difference resulting from the determined differences in respective distances.

19. The flight transceiver station of claim 13, wherein the flight transceiver station is configured to determine the position of the flight transceiver station in 3-dimensional space directly or indirectly by means of information obtained from a global navigation satellite system and a prediction of a flight path of the aircraft.

20. The flight transceiver station of claim 13, wherein the flight transceiver station is configured to receive the attitude of the flight transceiver station from a flight manager system.

21. The flight transceiver station of claim 13, comprising sensors that determine the attitude of the flight transceiver station.

22. The flight transceiver station of claim 13, wherein the attitude of the flight transceiver station is determined using gyroscopes.

23. The flight transceiver station of claim 13, wherein the flight transceiver station is configured to perform operate the beam control circuitry and the transceiver circuitry in support of a handover.

24. The flight transceiver station of claim 23, comprising:

circuitry configured to receive configuration information about one or more handover target terrestrial transceiver points.

* * * * *